United States Patent

Huttemann

[15] 3,690,203
[45] Sept. 12, 1972

[54] CUTTING APPARATUS FOR FOAM MATERIAL AND THE LIKE

[72] Inventor: Helmut Huttemann, Krischerstrasse 80, 4019 Monheim, Germany

[22] Filed: Nov. 14, 1969

[21] Appl. No.: 876,805

[52] U.S. Cl. .................................................83/1, 83/176
[51] Int. Cl. .................................................B26d 1/46
[58] Field of Search...........................83/1, 4, 19, 176

[56] References Cited

UNITED STATES PATENTS

| | | | |
|---|---|---|---|
| 1,731,132 | 10/1929 | Hendry et al. | 83/176 X |
| 1,786,542 | 12/1930 | MacDonald | 83/1 |
| 2,214,461 | 9/1940 | Hendry | 83/176 |
| 2,902,091 | 9/1959 | Dahle | 83/176 X |
| 3,186,271 | 6/1965 | Kaiser | 83/19 X |
| 3,197,357 | 7/1965 | Schulpen | 83/176 X |
| 3,245,293 | 4/1966 | Kirchner | 83/1 |

FOREIGN PATENTS OR APPLICATIONS

| | | | |
|---|---|---|---|
| 1,328,105 | 4/1963 | France | 83/176 |

*Primary Examiner*—James M. Meister
*Attorney*—Oberlin, Maky, Donnelly & Renner

[57] ABSTRACT

Apparatus for cutting recesses into plates or the like of foam material having parallel top and bottom planar surfaces. The foam bodies are moved into a cutting area and compressed, with the compressing means including a pressure roller engaging the foam plate and pressing the same into recesses or openings formed in a vertically opposed counterpressure device, with cutting means cutting off the upper layer of the compressed foam material.

3 Claims, 4 Drawing Figures

CUTTING APPARATUS FOR FOAM MATERIAL AND THE LIKE

The present invention relates to apparatus for cutting recesses into plates, bars, webs, or the like, of foam or similar materials, and relates particularly to devices by means of which it is possible to work recesses of any desired outer edging and various depths into bodies consisting of foam material or materials with similar properties, such as sponge rubbers, polyvinylchloride foams, etc., having parallel top and bottom planar surfaces. Bodies thus processed are used frequently for packaging purposes.

BACKGROUND OF THE INVENTION

Hitherto, known devices serving this purpose have operated according to the following method. The figure to be cut is carved into a plate of wood, plastic or similar material. A plate of the desired foam material is placed upon the thus processed surface of the molding plate, and a plane punch is mounted above this foam material plate. As soon as the punch presses upon the foam material plate, it presses the foam material into the recesses of the wooden or plastic plate. By a plane cut directly above the molding plate, the foam plate is processed in such a way that at the more strongly compressed places more foam material is removed than at the less strongly compressed places, whereby in the area of the compressed places, after the pressure is lifted, the desired recesses are produced.

By this procedure, the edge of the recesses or of the cut-out figures are well copied, and a fine graduation in the depth of the recesses is also achieved. The disadvantage of these known devices, however, consists in their low cutting capacity. This results on the one hand from the fact, that the separating cutter must be moved through the compressed foam material and in this process, if a smooth surface of the final product is to be obtained, the cutting speed must not be very high. The low cutting speed is also due to the fact that the cutting is not continuous and therefore after each cut, the separating cutter must be returned to the initial position, the punch lifted, and a fresh foam plate inserted.

SUMMARY OF THE INVENTION

The invention aims at producing a continuously operating apparatus for cutting recesses into bodies of foam or similar materials, having parallel planar surfaces.

A further object of the invention consists in providing an apparatus for cutting recesses into plates, bars, webs or other bodies of foam or similar materials with parallel planar surfaces, in which apparatus the foam material bodies are continuously moved with relation to a cutter and are compressed, prior to the cutting process, by means of a replaceable pressure roller, in the cutting area, in such a manner that the foam material is pressed into openings or recesses of a likewise replaceable counterpressure device. Due to the fact that the base is shaped as a molded body and has openings of different sizes or depths, or various recesses, it is possible to cut out with the aid of the cutter or a suitable band saw, in a continuous operation, recesses or cavities which correspond to the shapes of the openings or recesses of the base, which are visible when the pressure is taken off the compressed foam material body.

A further object of the invention resides in the mounting of the pressure roller and the counterpressure device so that they can rest against each other, whereby the compression pressure can be regulated during the cutting process and thereby the cutting depth can be adjusted.

A still further object of the invention consists in providing a cutting apparatus for foam bodies or the like, in which the counterpressure device, serving as the mold, is a platelike die with recesses of any size and depth, which die passes along, together with the foam material elements to be processed, below the pressure roller. A cutter or band saw for cutting off the upper layer of the compressed foam-plastic elements is provided. After the cutting process, the die returns to its initial position where a fresh body to be processed can be placed thereon.

Yet another object of the invention consists in the provision of a cutting apparatus for foam material bodies or the like in which the counterpressure device is another pressure roller rotatable about its shaft.

Another object of the invention consists in providing an apparatus of the aforementioned kind in which the upper pressure roller is a hollow cylinder whose casing contains, as a die, one or more openings corresponding to the outer periphery of the desired cavity or cavities, and in which in the hollow cylinder a band saw or a suitable cutter is mounted in such a way that it cuts off the foam material pressed through the opening or openings. The saw may be an endless driven band passing along the inside of the hollow cylinder over rollers whose upper side moves in the connecting plane between the axes of the hollow cylinder and the pressure roller.

A further object of the invention consists in providing a machine for cutting recesses in foam material bodies which may be equipped by choice either with a pressure roller and a more or less flat die serving as counter-mold, or with a pressure roller and a hollow cylinder serving as counter-mold and having a casing which is a two-dimensional die. Thus the manufacture can be largely standardized since most parts can be alike for the two machine types.

Further aims, characteristics and advantages of the invention can be understood on the basis of the following description:

BRIEF DESCRIPTION OF THE DRAWINGS

In the application drawings, which show in partially diagrammatic form two embodiments of the invention.

DESCRIPTION OF THE PREFERRED EMBODIMENTS

Figure 1:
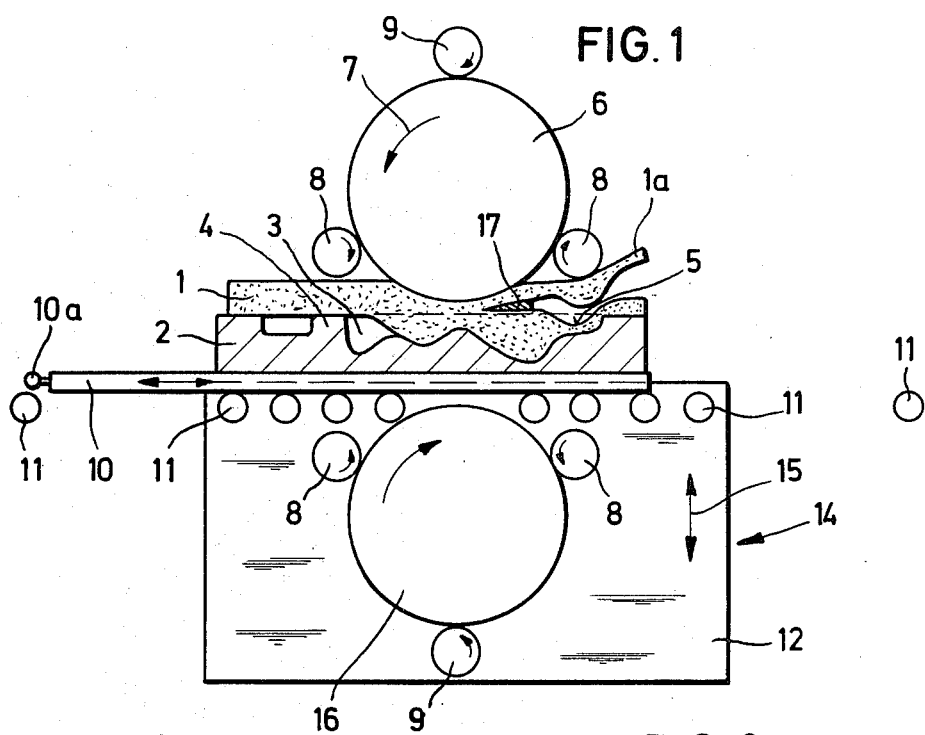
FIG. 1 is a side elevational view of a continuously operating cutting apparatus with an essentially flat die, moving back and forth under a pressure roller into which die the foam material is pressed in the cutting process.
Figure 2:
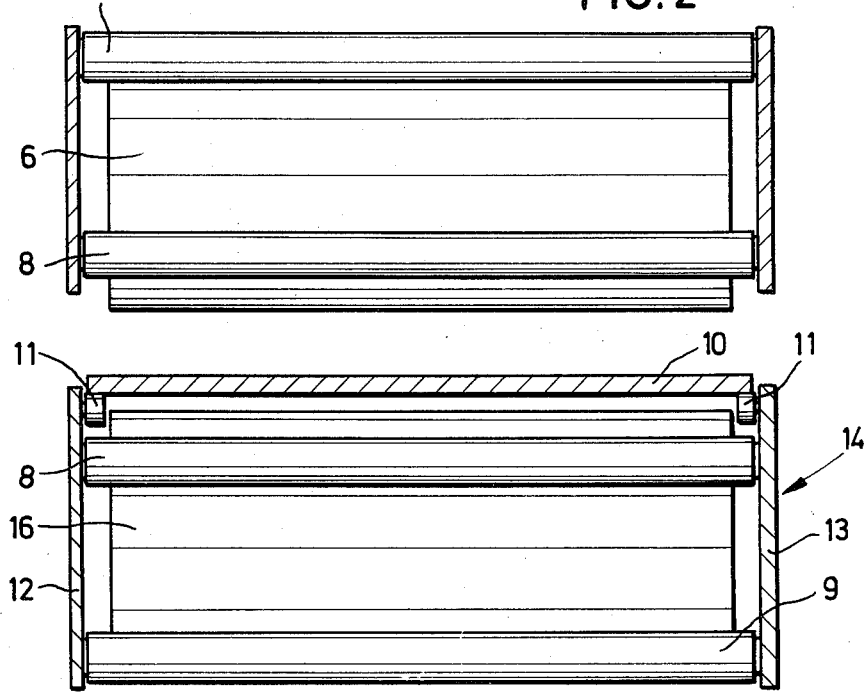
FIG. 2 is a front view of the apparatus of FIG. 1.

Referring to the apparatus shown in FIGS. 1 and 2, plates 1, of foam material with parallel planar surfaces, are placed upon an essentially flat die 2 in whose upper surface recesses 3 are formed between reliefs 4, which recesses correspond to the desired recesses 5 to be formed in the foam material plates 1.

After a foam material plate 1 has been deposited thereon, die 2, carrying the plate, is moved toward the right as seen in FIG. 1 and passes underneath a cylindrical pressure roller 6 which presses the foam material into the recesses 3. Since pressure roller 6 is driven in the direction of arrow 7, the foam material plate 1 is drawn into the pressure area.

Upper pressure roller 6 rests upon two freely rotatable guide rollers 8 and is driven by a drive roller 9 provided with a rubber coating which roller also produces the necessary abutment pressure. Rollers 8 and 9 can be adjusted with relation to each other in such a way that pressure rollers 6 with various diameters, whose lowest point, however, is located always at the same level, can be placed between them. Pressure roller 6 is therefore replaceable and can be replaced by a die roller as described below.

Die 2 is fastened, in a manner not shown in detail, to a table 10 which can be moved back and forth and is attached at one end 10a to a drive not shown. Table 10 rests with its lateral edges on rollers 11 which are supported by a frame consisting of lateral plates 12 and 13. Frame 14 is vertically adjustable in the direction of arrow 15.

Between the plates rests a pressure roller 16 similar to pressure roller 6, which rotates between guide shafts 8 and a driving shaft 9 provided with a rubber coating. Thus pressure rollers 6 and 16 can be driven synchronously.

Immediately behind pressure roller 6, a stationary cutter 17 is mounted which peels off a layer 1a from the foam material plate 1 before the compression pressure exerted by pressure roller 6 upon the foam material plate has been lifted. Thereby more material is taken off at the more strongly compressed places than at other places, so that after the load is taken off the foam material plates, the desired recesses 5 are present on the upper surface thereof, which recesses correspond to the recesses 3 carved in the upper surface of die 2. F. Figures of any shape can thus be cut.

The cutting depth can be regulated by means of the compression pressure which prevails beneath pressure roller 6. This compression pressure is varied by displacement of frame 14 with relation to pressure roller 6, as indicated by a double arrow 15.

Figure 3:
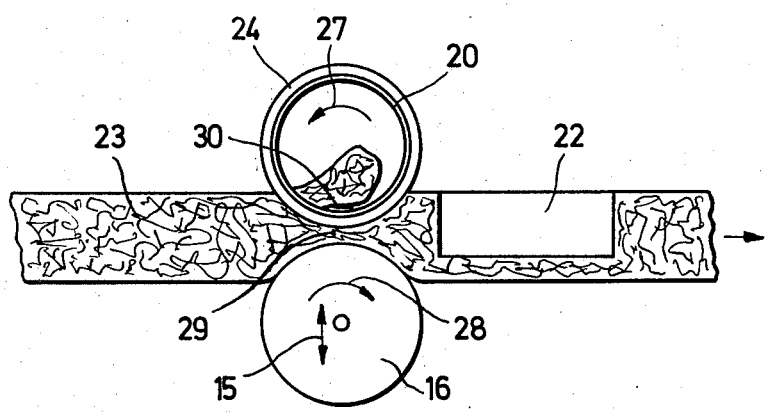
FIG. 3 is a side view similar to that of FIG. 1 of a modified embodiment of the apparatus of the invention, wherein the foam material to be processed passes between a pressure roller at the bottom and hollow cylinder at the top, whose casing is a two-dimensional cutting die.
Figure 4:
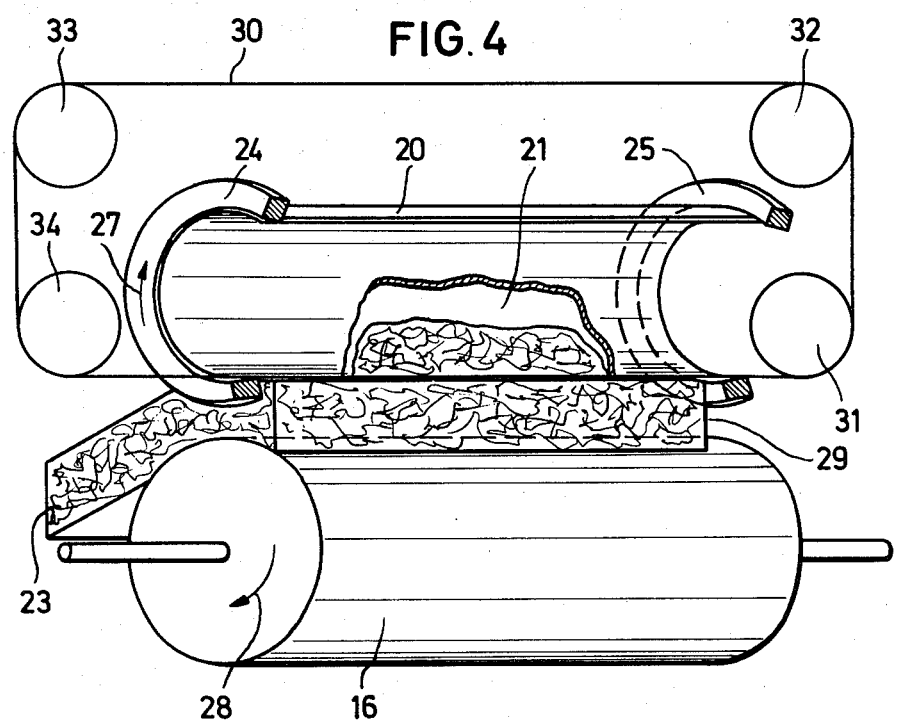
FIG. 4 is a diagrammatic view of the apparatus of FIG. 3, wherein the hollow cylinder is cut open so that the position, in the cylinder, of the band saw, which is

In the FIGS. 3-4 form of the invention, a two-dimensional die 20 is employed. This die 20 consists of a plate, 2-3 mm thick, of sheet steel or another resistant material, provided with openings 21, which correspond to the outer edges of recesses 22 in foam material plates 23. Die 20 is bent into a hollow cylinder and secured to two disc-shaped rings 24 and 25, so that a die roller is produced. Beneath this die roller a smooth solid pressure roller 16 is mounted.

By letting the die roller and pressure roller 16 rotate in the direction of arrows 27 and 28 and permitting a foam material plate 23 to enter a gap 29 positioned between these plates, the foam material plate 23 is seized, compressed and conveyed through the gap. At places where die 20 contains openings 21, the foam material plate 23 is seized, compressed and conveyed through the gap. At places where die 20 contains openings 21, the foam material is pressed, corresponding to the contact pressure of pressure roller 16, through these openings 21 into the inside space of the hollow die roller.

An endless saw band 30, which passes over rollers 31, 32, 33 and 34, is clamped inside the die roller at the point of smallest distance between die 20 and pressure roller 16, close to the inside wall of the hollow cylinder and parallel to a generatrix thereof. Due to the rotation of the hollow die roller, the foam material, pressed through openings 21 toward the inside flows into the range of saw band 30 and is cut by the said band from foam material plate 23. The pressure with which pressure roller 16 presses the foam material through openings 21 in the hollow cylinder determines the depth of recesses 22 of the foam material plates 23, with the pressure roller 16 being movable toward die 20 or away therefrom as shown by double arrow 15 to regulate the cutting depth.

As can be easily recognized, it is possible in accordance with the FIGS. 1-2 embodiment to cut recesses of almost any size and depth over the surface of the foam material, whereas with the second embodiment only simple recesses can be cut which are sufficient for simple packages.

The substantial advantages of the proposed devices consist in that high yields can be obtained because the cutting can be carried out continually and mechanically. In such an embodiment two-dimensional dies can be used, whereby the cost of mold preparation is greatly reduced.

According to the invention the apparatus shown in FIGS. 1 and 2 can also operate according to the principles of FIGS. 3 and 4. If the apparatus is to cut by means of three-dimensionally shaped dies 2 in the manner above described, the frame 14 which supports the lower pressure roller 16 is moved downward and slide table 10 is placed on rollers 11, with the die 2 fastened to sliding table 10. Foam material 1 lying on die 2 is then moved in the operation with the sliding table beneath pressure roller 6, in which process the material is separated as described above.

If the apparatus is to operate according to principles of FIGS. 3 and 4, upper pressure roller 6 is replaced by a die 20 with the desired recesses 21. Sliding table 10 and die 2 are removed from the apparatus, and the support frame 14 for the lower pressure roller 16 is moved upward until a gap 29 of the desired width has been produced between rollers 20 and 16. Cutting band 30 is inserted in the upper pressure or die roller 20. After these changes the apparatus can operate as shown in FIGS. 3 and 4.

I claim:

1. Apparatus for cutting recesses in plates, bars, webs, or the like made of foam or similar materials, comprising frame means, a die in whose upper surface a plurality of recesses are formed corresponding to the desired recesses to be formed in the foam plates, means for supporting and continuously moving said foam plates into a cutting area, roller means fixedly mounted on said frame means for rolling support of said means for supporting said foam plates, means for vertically adjustably supporting said plate supporting means for vertical adjustment of said die and thus said foam plates carried thereby, cutting means positioned in said cutting area, a pressure roller above said cutting area, and means for supporting and rotating said pressure roller in a fixed vertical position, said pressure roller compressing said foam plates into the recesses in said die for the desired cutting of said plates by said cutting means.

2. The apparatus of claim 1 wherein said cutting means comprises a cutter disposed behind said pressure roller in the path of travel of said foam plates, said cutter extending over the entire operating width of the apparatus for cutting off the upper layer of the compressed foam material.

3. The apparatus of claim 1 characterized in that said pressure roller is supported for rotation between two guide rollers, and a drive roller mounted above and in contact with said pressure roller for driving the same.

* * * * *